US012808514B2

(12) United States Patent
Van Bommel et al.

(10) Patent No.: US 12,808,514 B2
(45) Date of Patent: Nov. 24, 2026

(54) LIGHT ENGINE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Erik Petrus Johannes Mallens, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/145,627

(22) PCT Filed: Dec. 22, 2023

(86) PCT No.: PCT/EP2023/087542
§ 371 (c)(1),
(2) Date: Jul. 3, 2025

(87) PCT Pub. No.: WO2024/146836
PCT Pub. Date: Jul. 11, 2024

(65) Prior Publication Data

US 2026/0218882 A1 Jul. 30, 2026

(30) Foreign Application Priority Data

Jan. 5, 2023 (EP) .................................... 23150378

(51) Int. Cl.
*F21V 13/08* (2006.01)
*F21S 10/02* (2006.01)
(Continued)

(52) U.S. Cl.
CPC .............. *F21V 13/08* (2013.01); *F21S 10/02* (2013.01); *F21V 7/0033* (2013.01); *F21V 7/08* (2013.01);
(Continued)

(58) Field of Classification Search
CPC .......... F21V 13/08; F21V 7/0033; F21V 7/08; F21V 9/45; F21S 10/02; G02B 27/102; F21W 2131/406; F21Y 2115/30
See application file for complete search history.

(56) References Cited

U.S. PATENT DOCUMENTS

2010/0283975 A1* 11/2010 Hsiung ................ G03B 21/005 353/31
2014/0111967 A1* 4/2014 Rehn .................... G02B 27/141 362/84

(Continued)

FOREIGN PATENT DOCUMENTS

CN 214198524 U 9/2021
CN 214501113 U 10/2021
WO WO-2020255785 A1 * 12/2020 ............... H04N 5/74

OTHER PUBLICATIONS

English translation of Homma WO-2020255785-A1 (Year: 2020).*

*Primary Examiner* — Evan P Dzierzynski

(57) ABSTRACT

A light engine (100) comprises a first and a second laser arrangement (10, 11) emitting blue laser light. A first mirror arrangement (12) partly reflects the blue laser light (51) emitted by the second laser arrangement (11) into a first part of second blue laser light (53) and a phosphor element (13) receives the blue laser light (50) emitted by the first laser device (10) and receives the first part of second blue laser light (53), and converts at least part of the blue laser light (50) emitted by the first laser device (10) and the first part of second blue laser light (53) into (green-yellow and/or red) converted light (55). The (green-yellow and/or red) converted light (55) is collimated and combined with a second part of second blue laser light (52) emitted by the second laser arrangement (11) not reflected by the first mirror arrangement (12) to generate white engine light (58).

15 Claims, 9 Drawing Sheets

(51) Int. Cl.

| | |
|---|---|
| ***F21V 7/00*** | (2006.01) |
| ***F21V 7/08*** | (2006.01) |
| ***F21V 9/45*** | (2018.01) |
| ***G02B 27/10*** | (2006.01) |
| *F21W 131/406* | (2006.01) |
| *F21Y 115/30* | (2016.01) |

(52) U.S. Cl.
CPC .............. *F21V 9/45* (2018.02); *G02B 27/102* (2013.01); *F21W 2131/406* (2013.01); *F21Y 2115/30* (2016.08)

(56) References Cited

U.S. PATENT DOCUMENTS

2017/0350562 A1* 12/2017 Khrushchev .......... H01S 5/0087
2020/0333697 A1* 10/2020 Tanaka ................. H04N 9/3105

* cited by examiner

LIGHT ENGINE

CROSS-REFERENCE TO PRIOR APPLICATIONS

This application is the U.S. National Phase application under 35 U.S.C. § 371 of International Application No. PCT/EP2023/087542, filed on Dec. 22, 2023, which claims the benefit of European Patent Application No. 23150378.0, filed on Jan. 5, 2023. These applications are hereby incorporated by reference herein.

FIELD OF THE INVENTION

The present disclosure relates to a light engine comprising laser arrangements and where the light engine is configured to generate white light.

BACKGROUND OF THE INVENTION

In order to provide a visually pleasing view of, e.g., a live performance at a venue such as a theatre stage or concert hall it is often important that illumination of the performance is provided by light that has a desired intensity and a desired color temperature, for example a color temperature that corresponds to white light. So-called light engines, or lighting engines, are typically used for such a purpose. Needless to say, large venues require powerful light engines that are capable of emitting light having high intensity. Such light engines may comprise laser light sources in the form of so-called laser banks having a plurality of individual laser beam emitters that, by means of various optical components, can produce a desired light, e.g. white light, for illuminating the venue in question.

However, a drawback of laser beam light in the context of providing a visually pleasing view of a live performance at a theatre or concert venue is that laser beam light is virtually monochromatic. Although a laser bank comprising a plurality of laser beam emitters is capable of providing a very high intensity light, there still remains a problem of how to enable a light engine to provide high intensity white light.

SUMMARY OF THE INVENTION

In view of the above, an object of the present disclosure is to overcome drawbacks related to laser bank based light engines. This object is achieved in a first aspect by a light engine configured to generate engine light.

The light engine of the first aspect comprises a first laser arrangement configured to emit first blue laser light and a second laser arrangement configured to emit second blue laser light. The light engine further comprises a first mirror arrangement, for example dichroic or metallic mirror, that is being partially reflective for the second blue laser light and partially transmissive for the second blue laser light and configured to split the second blue laser light emitted by the second laser arrangement into a first part of second blue laser light and a second part of second blue laser light, wherein the ratio (R) of the first part of second blue laser light to the second part of second blue laser light is in a range from 0.1 to 2. A beam combiner is arranged downstream of the first mirror arrangement and configured to combine the first blue laser light and the first part of second blue laser light, and to direct the combination of the first blue laser light and the first part of second blue laser light to a phosphor element. The phosphor element arranged downstream of the beam combiner and is configured to receive the first blue laser light emitted by the first laser arrangement and receive the first part of second blue laser light, and convert the first blue laser light emitted by the first laser arrangement and the first part of second blue laser light into (e.g. green-yellow and/or red) converted light. Furthermore, the light engine is configured to collimate the (e.g. green-yellow and/or red) converted light emitted by the phosphor element and to combine the collimated (e.g. green-yellow and/or red) converted light with the second part of second blue laser light emitted by the second laser arrangement to generate the engine light. The engine light is white light having a correlated color temperature in a range from 2700 K to 10000 K, preferably in a range 5000 K to 10000 K and a color rendering index of at least 70, preferably at least 80, more preferably at least 85, more preferably at least 88.

In other words, blue laser light provided by the first laser arrangement together with part of the blue laser light provided by the second laser arrangement is used to pump a phosphor element providing (e.g. green-yellow and/or red) converted engine light, while the remaining blue light provided by the second laser arrangement is used for providing blue engine light. Combination of the (e.g. green-yellow and/or red) converted engine light and blue engine light creates the desired high intensity white engine light capable of providing a visually pleasing view of a live performance at a theatre or concert venue or other lighting applications.

In embodiments, the first mirror arrangement may be configured to partly reflect the second blue laser light emitted by the second laser arrangement into the first part of second blue laser light and configured to partly transmit the second blue laser light emitted by the second laser arrangement into the second part of second blue laser light.

Alternatively, in embodiments, the first mirror arrangement may be configured to partly transmit the second blue laser light emitted by the second laser arrangement into the first part of second blue laser light and configured to partly reflect the second blue laser light emitted by the second laser arrangement into the second part of second blue laser light.

In embodiments, the first laser arrangement may comprise a first laser bank. The first laser bank may comprise a plurality of individual first laser beam emitters e.g. configured to emit first laser light. The plurality of individual first laser beam emitters may be arranged in a first laser array. The first laser bank may comprise a first heat sink e.g. for cooling the plurality of individual first laser beam emitters. The first laser bank may comprise a first optical structure e.g. for collimating the first laser light into laser beams emitted by the first laser beam emitters.

In embodiments, the second laser arrangement may comprise a second laser bank. The second laser bank may comprise a plurality of individual second laser beam emitters e.g. configured to emit second laser light. The plurality of individual second laser beam emitters may be arranged in a second laser array. The second laser bank may comprise a second heat sink e.g. for cooling the plurality of individual second laser beam emitters. The second laser bank may comprise a second optical structure e.g. for collimating the second laser light into laser beams emitted by the second laser beam emitters.

In embodiments, the first blue laser light may have a first polarization and the second blue laser light may have a second polarization different from the first polarization e.g. 90 degrees rotated.

In embodiments, the first blue laser light may have a first (dominant and/or centroid) emission peak wavelength ($\lambda 1$) and the second blue laser light may have a second (dominant and/or centroid) emission peak wavelength ($\lambda 2$), wherein $|\lambda2-\lambda1|\leq 20$ nm, preferably $|\lambda2-\lambda1|\leq 15$ nm, more preferably $|\lambda2-\lambda1|\leq 10$ nm, most preferably $|\lambda2-\lambda1|\leq 5$ nm.

Alternatively, in embodiments, the first blue laser light may have a first (dominant and/or centroid) emission peak wavelength (λ1) and the second blue laser light may have a second (dominant and/or centroid) emission peak wavelength (λ2), wherein $|\lambda2-\lambda1|\geq 20$ nm, preferably $|\lambda2-\lambda1|\geq 25$ nm, more preferably $|\lambda2-\lambda1|\geq 30$ nm, most preferably $|\lambda2-\lambda1|\geq 35$ nm.

In embodiments, the beam combiner may comprise a polarizing reflector configured to (i) transmit the first blue laser light and reflect the first part of second blue laser light, or (ii) reflect the first blue laser light and transmit the first part of second blue laser light.

In embodiments, the beam combiner may comprise a dichroic reflector configured to (i) transmit the first blue laser light and reflect the first part of second blue laser light, or (ii) reflect the first blue laser light and transmit the first part of second blue laser light. In a preferred embodiment, the dichroic reflector may be also configured to transmit the first blue laser light, reflect the first part of second blue laser light, and reflect the collimated converted light.

In embodiments, the light engine may use one or more lenses to collimate the (e.g. green-yellow and/or red) converted light emitted by the phosphor element. The one or more lenses may also be used to focus the first blue laser light and the first part of second blue laser light onto the phosphor element.

In another preferred embodiment, a further dichroic reflector may be used. The further dichroic reflector may be arranged between the beam combiner and the phosphor element, especially the further dichroic reflector may be arranged between the beam combiner and the one or more lenses.

In embodiments, the light engine may further comprise a diffuser configured to diffuse the second part of second blue laser light. The diffuser may be used in a transmissive configuration or a reflective configuration. When using a diffuser in a transmissive configuration, a first lens arranged upstream of the diffuser may be used to focus the second part of the second blue laser light onto the diffuser and a second lens arranged downstream of the diffuser may be used to collimate the second part of the second blue laser light transmitted and diffused by the diffuser. In this way, diffused second part of the second blue laser light may be obtained. When using a diffuser in a reflective configuration, a first lens arranged upstream of the diffuser may be used to focus the second part of the second blue laser light onto the diffuser. The diffuser may be configured to reflect and diffuse the second blue laser light into diffused second part of the second blue laser light.

In embodiments, the collimated converted light emitted by the phosphor element may be combined with the (diffused) second part of second blue laser light by using a further beam combiner. The further beam combiner may comprise a further beam combiner dichroic mirror e.g. transmissive for collimated converted light and reflective for the second part of second blue laser light, or reflective for collimated converted light and transmissive for the second part of second blue laser light in order to combine the collimated converted light and the (collimated) (diffused) second part of second blue laser light. Alternatively, the further beam combiner may comprise a polarizing beam splitter e.g. transmissive for collimated converted light and reflective for the second part of second blue laser light having a first polarization and transmissive for the second part of second blue laser light having a second polarization different from the first polarization e.g. 90 degrees rotated, or reflective for collimated converted light and reflective for the second part of second blue laser light having a first polarization and transmissive for the second part of second blue laser light having a second polarization different from the first polarization e.g. 90 degrees rotated.

In embodiments, the beam combiner may comprise an optical component e.g. a dichroic mirror and/or a polarizing reflector (a.k.a. reflective polarizer) and/or a polarizing beam splitter.

In embodiments, the phosphor element may be in the form of a phosphor track on a wheel rotated by a motor.

In embodiments, the diffuser may be in the form of a diffuser track on a(nother) wheel rotated by a(nother) motor.

In embodiments, the engine light may comprise or is the (collimated) converted light and the (collimated) (diffused) second part of second blue laser light.

In embodiments, the ratio (R) of the first part of second blue laser light to the second part of second blue laser light may be in a range from 0.1 to 0.8 (which is especially suitable for general lighting), 0.8 to 1.5 (which is especially suitable for stage lighting) and/or in a range from 1.5 to 2 (which is especially suitable for moving head lights).

In embodiments, the light engine may comprise a diffuser configured to diffuse the second part of second blue laser light. The diffuser may be arranged in a transmissive or a reflective mode. In case of the transmissive mode, a first optical arrangement e.g. lens may be arranged upstream the diffuser to focus the second part of second blue laser light onto the diffuser and a second optical arrangement e.g. lens may be arranged downstream the diffuser to collimate the (diffused) second part of second blue laser light (into collimated second part of second blue laser light). In case of the reflective mode, a third optical arrangement e.g. lens may be arranged upstream the diffuser to focus the second part of second blue laser light onto the diffuser and to collimate the (reflected) (diffused) second part of second blue laser light (into collimated second part of second blue laser light). In case of the reflective mode, a ¼ waveplate may be arranged upstream of the (third optical arrangement and) diffuser. A polarizing beam splitter may be arranged upstream of the ¼ waveplate and configured to transmit the (non-diffused) second part of second blue laser light and reflect the diffused second part of second blue laser light or vice versa.

In embodiments, the light engine may comprises a further beam combiner e.g. a further dichroic mirror or a further polarizing beam splitter configured to combine the (collimated) the (green-yellow and/or red) converted light emitted by the phosphor element with the (diffused) second part of second blue laser light.

In embodiments, the correlated color temperature of the white engine light may be varied e.g. from a first correlated color temperature to a second correlated color temperature e.g. with a difference of at least 500K or at least 1000K. The correlated color temperature may be varied by using a controller for individually controlling the first blue laser light emitted by the first laser arrangement and the second blue laser light emitted by the second laser arrangement. While varying the correlated color temperature, the first mirror arrangement may be kept at a fixed position.

In some embodiments, the first mirror arrangement is specularly reflective with a reflectivity of at least 80%, preferably at least 85%, more preferably at least 90%, for the second blue laser light emitted by the second laser arrangement.

In various embodiments, the first mirror arrangement may be configured to adjust a ratio between the first part of second blue laser light and the second part of second blue laser light. For example, the first mirror arrangement may be configured such that it is spatially adjustable for the adjustment of the ratio between the first part of second blue laser light and the second part of second blue laser light.

That is, various embodiments advantageously provide an effect that the ratio between the (green-yellow and/or red) converted light and (diffused) blue engine light can be changed such that different color temperatures can be achieved. In other words, various embodiments are capable of providing a dynamically tunable light engine.

In some embodiments, the second laser arrangement may comprise a plurality of individual second laser beam emitters and the first mirror arrangement may comprise a mirror configured to reflect laser beams emitted by a subset of the second laser beam emitters.

That is, being a very simple construction, such a mirror reflects the laser beams emitted by a subset of the second laser beam emitters and thereby allowing them to reach the phosphor element, while allowing, e.g., the remaining emitted laser beams that are not reflected by the mirror to continue and combine with the converted light from the phosphor element. By configuring such a mirror such to be spatially adjustable, an adjustable number of laser beams to be reflected may be obtained and thereby constituting an embodiment of a dynamically tunable light engine.

In some embodiments, the second laser arrangement may comprise a plurality of individual second laser beam emitters and the first mirror arrangement may comprise a plurality of beam mirrors, for example circular, oval or elliptical in shape, configured to reflect respective laser beams emitted by a subset of the second laser beam emitters. For example, a respective cross-sectional area of the beam mirrors may be greater than a respective cross-sectional area of the laser beams reflected by the beam mirrors.

That is, in such a configuration each individual mirror reflects a respective laser beam emitted by a respective second laser beam emitter and thereby allowing them to reach the phosphor element, while allowing, e.g., the remaining emitted laser beams that are not reflected by a respective mirror to continue and combine with the converted light from the phosphor element. By configuring the plurality of such a mirrors to be individually spatially adjustable, an adjustable number of laser beams to be reflected may be obtained and thereby constituting an embodiment of a dynamically tunable light engine.

In some embodiments, the second laser arrangement may comprise a plurality of individual second laser beam emitters and the first mirror arrangement may comprise a plurality of beam mirrors, for example circular, oval or elliptical in shape, configured to reflect respective parts of laser beams emitted by at least a subset of the second laser beam emitters. For example, a respective cross-sectional area of the beam mirrors may be less than 0.25 times a respective cross-sectional area of the laser beams reflected by the beam mirrors.

That is, in such a configuration each individual mirror has an area that is smaller than the cross-sectional area of a respective laser beam. Each mirror then reflects only a part of a respective laser beam emitted by a respective second laser beam emitter and thereby allowing them to reach the phosphor element, while allowing the remaining parts of the emitted laser beams that are not reflected by a respective part of a mirror to continue and combine with the converted light from the phosphor element. By configuring the plurality of such a mirrors to be individually spatially adjustable, an adjustable number of laser beams to be reflected may be obtained and thereby constituting an embodiment of a dynamically tunable light engine.

In some embodiments, the second laser arrangement may comprise a plurality of individual second laser beam emitters and the first mirror arrangement may comprise a mirror configured with plurality of beam holes, for example circular, oval or elliptical in shape, for passage of respective laser beams emitted by a subset of the second laser beam emitters. For example, a respective cross-sectional area of the beam holes may be greater than a respective cross-sectional area of the laser beams passing through the beam holes.

That is, in such a configuration the mirror reflects a subset of the laser beam emitted by a respective second laser beam emitter and thereby allowing them to reach the phosphor element, while allowing, e.g., the remaining emitted laser beams that pass through respective beam hole and thereby not reflected by the mirror to continue and combine with the converted light from the phosphor element. By configuring the mirror to be adjustable in terms of number of beam holes, an adjustable number of laser beams to be reflected may be obtained and thereby constituting an embodiment of a dynamically tunable light engine.

In some embodiments, the second laser arrangement may comprise a plurality of individual second laser beam emitters and the first mirror arrangement may comprise a mirror configured with plurality of beam holes, for example circular, oval or elliptical in shape, for passage of respective parts of laser beams emitted by at least a subset of the second laser beam emitters. For example, a respective cross-sectional area of the beam holes may be less than 0.25 times a respective cross-sectional area of the laser beams passing through the beam holes.

That is, in such a configuration each individual beam hole has an area that is smaller than the cross-sectional area of a respective laser beam. The mirror then reflects only a part of a respective laser beam emitted by a respective second laser beam emitter and thereby allowing them to reach the phosphor element, while allowing the remaining parts of the emitted laser beams that pass through a respective beam hole to continue and combine with the converted light from the phosphor element. By configuring the mirror and beam holes to be spatially adjustable, an adjustable part of laser beams to be reflected may be obtained and thereby constituting an embodiment of a dynamically tunable light engine.

As summarized above, the first mirror arrangement may advantageously be configured in various ways in which a desired ratio between the first part of blue light and the second part of blue light can be obtained. Furthermore, by changing the number of beam mirrors or beam holes, or changing the spatial extent of the beam mirrors or beam holes, a dynamical adjustment can be obtained of the ratio between the first part of blue light and the second part of blue light.

In a further aspect, there is provided a luminaire comprising a light engine as summarized above and a controller for controlling the first and second laser arrangement. Such a luminaire and embodiments of such a luminaire provide corresponding effects and advantages as summarized above.

DETAILED DESCRIPTION

Figure 1A:
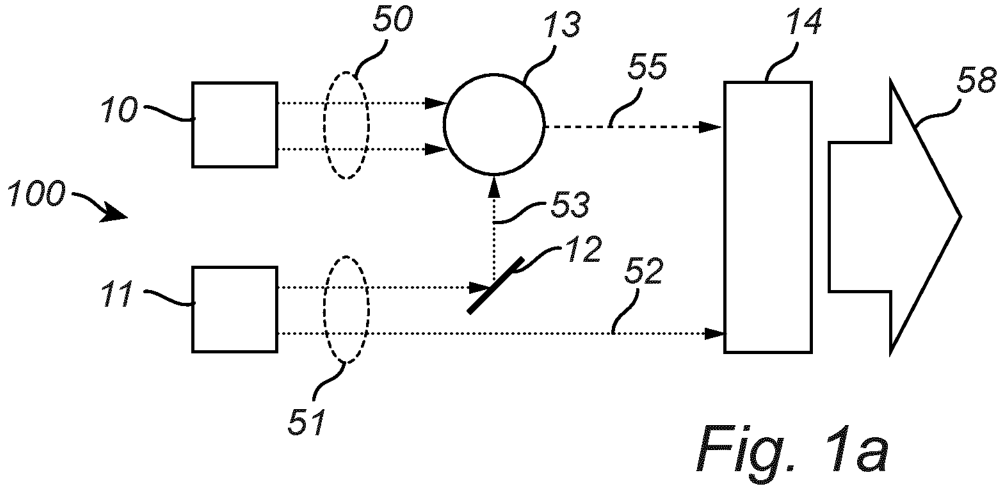
FIG. 1*a* is a block diagram that schematically illustrates a light engine.

FIG. 1*a* illustrates a light engine 100 configured to generate engine light 58. The light engine 100 comprises a first laser arrangement 10 configured to emit first blue laser light 50 and a second laser arrangement 11 configured to emit second blue laser light 51. A first mirror arrangement 12 being partially reflective for the second blue laser light 51 and partially transmissive for the second blue laser light 51 and is configured to split the second blue laser light 51 emitted by the second laser arrangement 11 into a first part of second blue laser light 53 and a second part of second blue laser light 52, wherein the ratio (R) of the first part of second blue laser light 53 to the second part of second blue laser light 52 is in a range from 0.1 to 2. A beam combiner 68, 76 is arranged downstream of the first mirror arrangement and configured to combine the first blue laser light 50 and the first part of second blue laser light 53 and to direct the combination of the first blue laser light 50 and the first part of second blue laser light 53 to a phosphor element 13. The phosphor element 13 arranged downstream of the beam combiner and is configured to receive the first blue laser light 50 emitted by the first laser arrangement 10 and receive the first part of second blue laser light 53. The phosphor element 13 converts the first blue laser light 50 emitted by the first laser arrangement 10 and the first part of second blue laser light 53 into (e.g. green-yellow and/or red) converted light 55. The light engine 100 is further configured to collimate the (e.g. green-yellow) converted light 55 emitted by the phosphor element 13 and to combine the collimated (e.g. green-yellow and/or red) converted light with the second part of second blue laser light 52 emitted by the second laser arrangement 11 to generate the engine light 58. The engine light 58 is white light having a correlated colour temperature in a range from 2700 K to 8000 K, preferably in a range 5000 K to 10000 K and a colour rendering index of at least 70, preferably at least 80, more preferably at least 85, more preferably at least 88.

The first mirror arrangement 12 may be of a type that is specularly reflective with a reflectivity of at least 80%, preferably at least 85%, more preferably at least 90%, for the second blue laser light 51 emitted by the second laser arrangement 11. Moreover, the first mirror arrangement 12 may be dichroic or metallic.

Moreover, the first mirror arrangement 12 may be configured to adjust a ratio between the first part of second blue laser light 53 and the second part of second blue laser light 52. For example, the first mirror arrangement 12 may be configured such that it is spatially adjustable for the adjustment of the ratio between the first part of second blue laser light 53 and the second part of second blue laser light 52.

In various embodiments, the first mirror arrangement 12 may be configured such that it is spatially adjustable for the adjustment of the ratio between the first part of second blue laser light 53 and the second part of second blue laser light 52 by way of a translational movement or rotational movement. For example, a distance between the second laser arrangement 11 and the first mirror arrangement 12 is varied, e.g. by using a (electric) motor. For example, a rotation angle of the first mirror arrangement 12 with respect to the second laser arrangement 11 may be varied, e.g. by using a (electric) motor.

As will be exemplified below in connection with FIGS. 8 to 14, the light engine 100 may further comprise a diffuser 65, 78 configured to diffuse the second part of second blue laser light 52. Moreover, in various embodiments, the first and/or second laser arrangement 10, 11 may comprise laser arrangement optics such as a one or more lenses or lens arrays.

With regard to the blue laser light emitted by the laser arrangements 10, 11, in various embodiments, the first blue laser light 50 may have a first dominant peak wavelength in a wavelength range from 430 nm to 490 nm, preferably 440 nm to 470 nm. In various embodiments, the second blue laser light 51 may have a second dominant peak wavelength in a wavelength range from 430 nm to 490 nm, preferably 440 nm to 470 nm, and in various embodiments, the first and second dominant peak wavelength may be substantially the same. Regarding the (green-yellow and/or red) converted light 55, it may in various embodiments have a dominant converted peak wavelength in a wavelength range from 495 nm to 590 nm, preferably 520 nm to 570 nm.

Figure 1B:
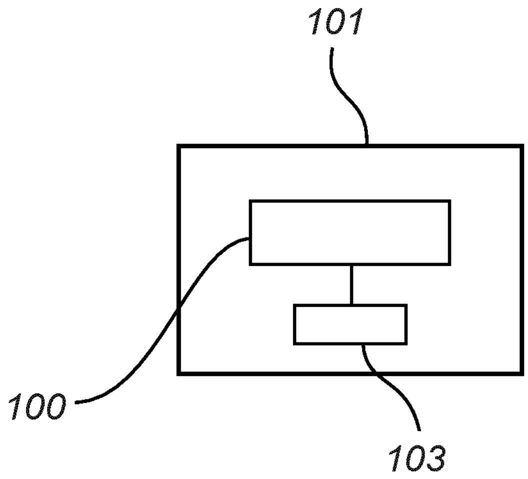
FIG. 1*b* is a block diagram that schematically illustrates a luminaire comprising a light engine.

FIG. 1*b* is a block diagram that schematically illustrates a luminaire 101 comprising a light engine 100 such as the light engine 100 exemplified herein. The luminaire 101 comprises a controller 103 for controlling the first and second laser arrangement 10, 11 jointly or individually.

Figure 2:
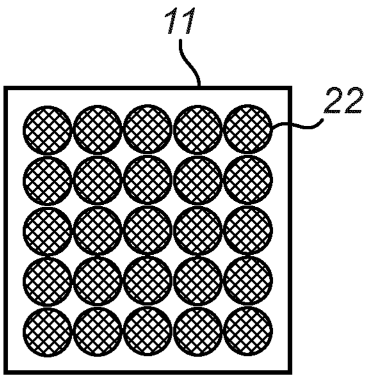
FIG. 2 is a plan view that schematically illustrates a laser arrangement for a light engine.

Embodiments involving configurations of the first mirror arrangement 12 capable of adjustment of the ratio between the first part of second blue laser light 53 and the second part of second blue laser light 52 will now be described with reference to FIGS. 2 to 7, and with continued reference to FIG. 1*a*. Common to these embodiments is a configuration of the second laser arrangement 11, which comprises a plurality of individual second laser beam emitters 22. FIG. 2 schematically illustrates these second laser beam emitters 22 as seen head-on and arranged in a rectangular matrix configuration. Such a matrix configuration is not essential and any non-rectangular matrix configuration may be used as the skilled person will realize.

Figure 3:
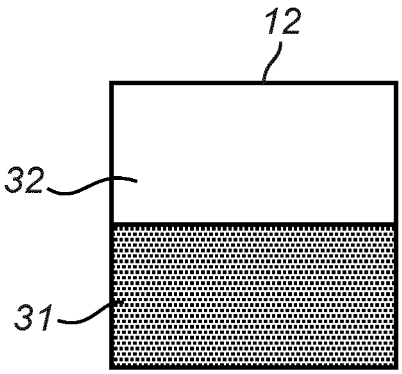
FIGS. 3 to 7 are plan views that schematically illustrate a respective mirror arrangement for a light engine.

As illustrated in FIG. 3 the first mirror arrangement 12 may comprise a mirror 31 configured to reflect laser beams emitted by a subset of the second laser beam emitters 22. As FIG. 3 exemplifies, the mirror 31 may simply be a rectangular reflective plane. Depending on factors related to how the mirror arrangement 12 is to be mounted in the light engine 100, it may require a transparent part 32, although such details are outside the scope of the present disclosure. In any case, mounting of the mirror arrangement 12 in the light engine 100 is such that a desired number of the laser beams emitted by the second laser beam emitters 22 are reflected by the mirror 31 and eventually reach the phosphor element 13, while the remaining number of laser beams emitted by the second laser beam emitters 22 pass by the mirror 31 and continue and combine with the converted light 55 from the phosphor element 13 as described herein.

Figure 4:
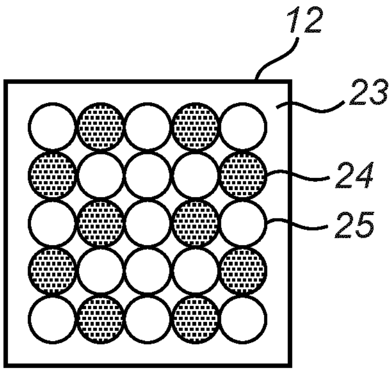

As illustrated in FIG. 4 the first mirror arrangement 12 may comprise a plurality of beam mirrors 24 configured to reflect respective laser beams emitted by a subset of the second laser beam emitters 22. As FIG. 4 exemplifies, the beam mirrors 24 may be configured to be arranged in a matrix fashion that corresponds to the arrangement of the second laser beam emitters 22 as exemplified in FIG. 2, and where the number of beam mirrors 24 determines how many of the laser beams emitted by the second laser beam emitters 22 are reflected and eventually reach the phosphor element 13. As FIG. 4 exemplifies, the mirror arrangement 12 may comprise a frame structure 23 having beam holes 25 through which laser beams emitted by the second laser beam emitters 22 and not reflected by a beam mirror 24 pass and continue and combine with the converted light 55 from the phosphor element 13 as described herein. A respective cross-sectional area of the beam mirrors 24 may be greater than a respective cross-sectional area of the laser beams reflected by the beam mirrors 24. For a circular geometry, this corresponds to a relationship where respective diameters of the beam mirrors 24 is greater than a respective diameter of the laser beams reflected by the beam mirrors 24.

Figure 5:
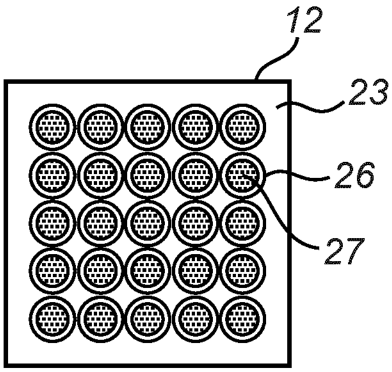

As illustrated in FIG. 5 the first mirror arrangement 12 may comprise a plurality of beam mirrors 27 configured to reflect respective parts of laser beams emitted by at least a subset of the second laser beam emitters 22. As FIG. 5 exemplifies, the beam mirrors 27 may be configured to be arranged in a matrix fashion that corresponds to the arrangement of the second laser beam emitters 22 as exemplified in FIG. 2, and where the size of the beam mirrors 27 determines how big part of respective laser beam emitted by the second laser beam emitters 22 are reflected and eventually reach the phosphor element 13. As FIG. 5 exemplifies, the mirror arrangement 12 may comprise a frame structure 23 having beam holes 26 through which the part of the laser beams emitted by the second laser beam emitters 22 and not reflected by a beam mirror 27 pass and continue and combine with the converted light 55 from the phosphor element 13 as described herein. The embodiment of FIG. 5 may be combined with the embodiment exemplified in FIG. 4, whereby embodiments are obtained where also the number of beam mirrors 27 is selected to provide a desired ratio between the first part of second blue laser light 53 and the second part of second blue laser light 52. Similar to the configuration illustrated in FIG. 4, a respective cross-sectional area of the beam mirrors 27 in FIG. 5 may be less than 0.25, preferably 0.16, more preferably 0.09, times a respective cross-sectional area of the laser beams reflected by the beam mirrors 27. For a circular geometry, this corresponds to a relationship where respective diameters of the beam mirrors 27 is less than 0.5, preferably 0.4, more preferably 0.3, of a respective diameter of the laser beams reflected by the beam mirrors 27.

Figure 6:
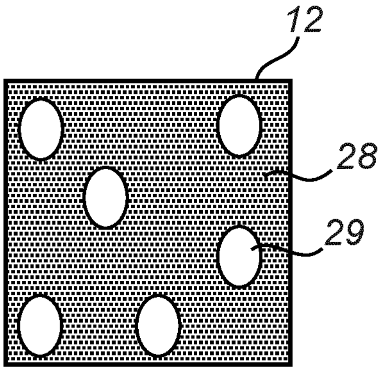

As illustrated in FIG. 6 the first mirror arrangement 12 may comprise a mirror 28 configured with plurality of beam holes 29 for passage of respective laser beams emitted by a subset of the second laser beam emitters 22. As FIG. 6 exemplifies, the beam holes 29 may be configured to be arranged in a matrix fashion that corresponds to the arrangement of the second laser beam emitters 22 as exemplified in FIG. 2, and where the number of beam holes 29 determines how many of the laser beams emitted by the second laser beam emitters 22 pass through the beam holes 29 and continue and combine with the converted light 55 from the phosphor element 13 as described herein, while the remaining laser beams emitted by the second laser beam emitters 22 are reflected by the mirror 28 and eventually reach the phosphor element 13. A respective cross-sectional area of the beam holes 29 may be greater than a respective cross-sectional area of the laser beams passing through the beam holes 29. For a circular geometry, this corresponds to a relationship where respective diameters of the beam holes 29 is greater than a respective diameter of the laser beams passing through the beam holes 29.

Figure 7:
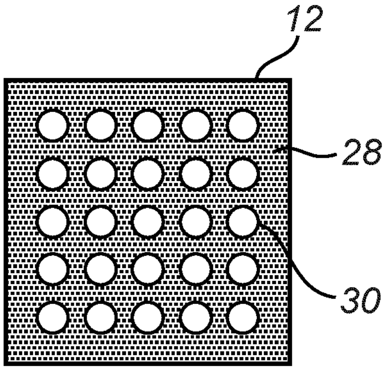

As illustrated in FIG. 7 the first mirror arrangement 12 may comprise a mirror 28 configured with plurality of beam holes 30 for passage of respective parts of laser beams emitted by at least a subset of the second laser beam emitters 22. As FIG. 7 exemplifies, the beam holes 30 may be configured to be arranged in a matrix fashion that corresponds to the arrangement of the second laser beam emitters 22 as exemplified in FIG. 2, and where the size of the beam holes 30 determines how large part of the laser beams emitted by the second laser beam emitters 22 pass through the beam holes 30 and continue and combine with the converted light 55 from the phosphor element 13 as described herein, while the remaining parts of the laser beams emitted by the second laser beam emitters 22 are reflected by the mirror 28 and eventually reach the phosphor element 13. The embodiment of FIG. 7 may be combined with the embodiment exemplified in FIG. 6, whereby embodiments are obtained where also the number of beam holes 30 is selected to provide a desired ratio between the first part of second blue laser light 53 and the second part of second blue laser light 52. Similar to the configuration illustrated in FIG. 6, a respective cross-sectional area of the beam holes 30 in FIG. 7 may be less than 0.25, preferably 0.16, more preferably 0.09, times a respective cross-sectional area of the laser beams passing through the beam holes 30. For a circular geometry, this corresponds to a relationship where respective diameters of the beam holes 30 is less than 0.5, preferably 0.4, more preferably 0.3, of a respective diameter of the laser beams passing through the beam holes 30.

As illustrated by the embodiments illustrated in FIGS. 4, 5 and 7, beam mirrors 24, 27 and beam holes 30 may have a shape that is circular. However, as illustrated in FIG. 6, in some embodiments the shape of beam holes 29 (and also, although not illustrated, beam mirrors) may have a shape that is oval or elliptical. Noting that the first mirror arrangement 12 typically is arranged with its plane non-perpendicular in relation to the direction of the beam of the second blue laser light 51, and noting that the second blue laser light 51 is typically a beam having a circular cross-section perpendicular to the direction of the beam, elliptically shaped beam mirrors and beam holes correspond advantageously with each other.

The various configurations of the first mirror arrangement 12 exemplified above may be realized in various ways, including but not limited to the following configurations: A reflective metallic sheet or layer may be perforated creating the holes. A reflective layer may be applied onto a transparent substrate and subsequently patterned. A reflective pattern may be provided on a transparent substrate, e.g. by use of evaporation and use of a mask, e.g. a mask with holes or dots. The mirror may be comprised of aluminum and/or silver. Also, stacks for layers with different thicknesses and/or refractive indices may be used, etc.

Figure 8:
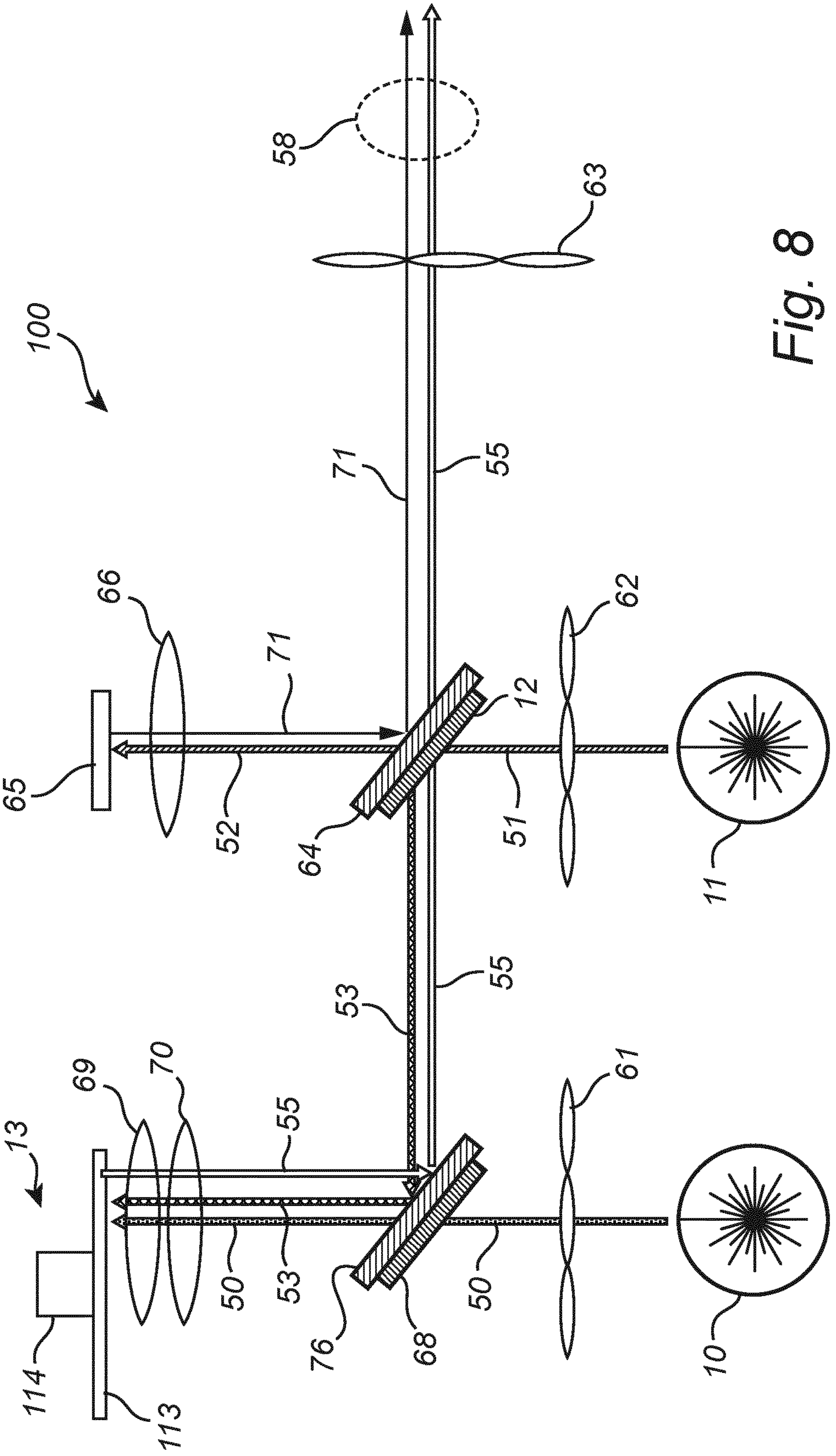
FIGS. 8 to 14 are block diagrams that schematically illustrate embodiments of a respective light engine.
Figure 9:
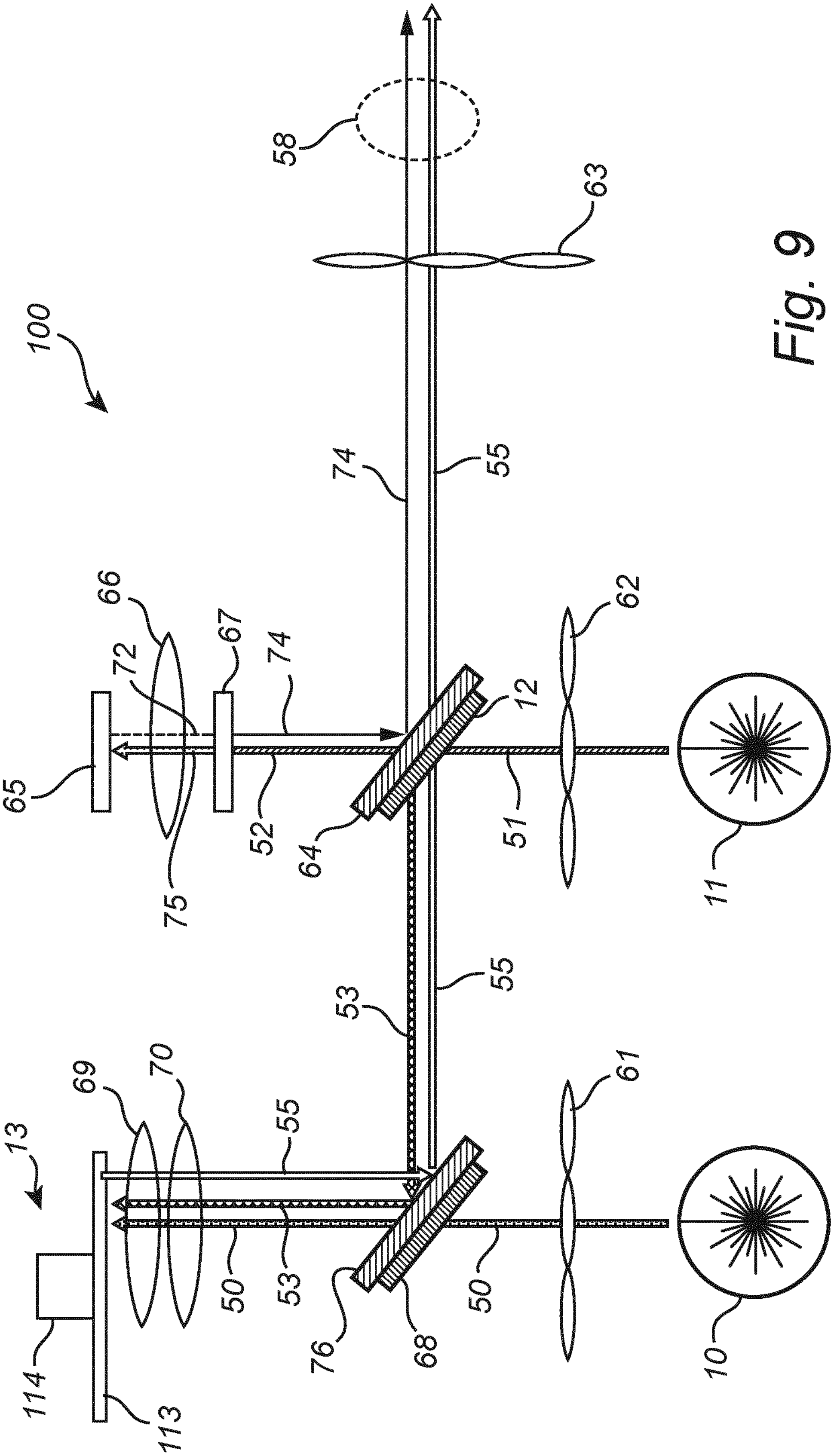

Turning now to FIGS. 8 and 9, further embodiments of a light engine will be described in some detail, focusing on how the laser beams emitted by the laser arrangements 10, 11 pass through various optical components in the light engine 100 and produce a desired output of white light 58.

FIG. 8 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through an optical component 68 that works as a polarizing beam splitter for the first blue laser light 50. The first blue laser light 50 is then focused by lenses 69, 70 onto the phosphor element 13 comprising a motor 114 that rotates a wheel 113 comprising a yellow phosphor track that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a phosphor tile arranged on a heatsink.

The second laser arrangement 11, also in the form of a blue laser bank, emits linearly polarized second blue laser light that after passing through a beam homogenizer 62 provides homogenized linearly polarized second blue laser light 51.

The second blue laser light 51 falls onto first mirror arrangement 12 and is partly reflected by a polarizing reflector 76 into the first part of second blue laser light 53 as described above. In this embodiment, the first mirror arrangement 12 is a semi reflecting dichroic mirror, which means that the first part of second blue laser light 53 is in the form of linearly polarized blue laser light with a polarization direction 90 degrees rotated with respect to the polarization direction of the blue laser light 50 provided by the first laser arrangement 10 as described above.

The first part of second blue laser light 53 is reflected by the optical component 68 and thereby becomes combined with the first blue laser light 50 and they both get focused by the lenses 69, 70 onto the phosphor element 13 and become the converted (green-yellow and/or red) light 55. The converted (green-yellow and/or red) light 55 is then totally reflected by the optical component 68, as mentioned above, and transmitted through the first mirror arrangement 12, remembering that it is a dichroic mirror, and transmitted through a polarizing beam splitter (or mirror) for blue light 64 arranged parallel to the first mirror arrangement 12.

A second part of second blue laser light 52, not reflected by the mirror arrangement 12 and transmitted through the polarizing beam splitter for blue light 64 is then focused onto a diffuser 65 by a lens 66. Reflected diffuse blue light is then collimated by the lens 66 and it becomes partially reflected by the polarizing beam splitter for blue light 64 and the first mirror arrangement 12.

The reflected blue light 71 is then combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

FIG. 9 illustrates an embodiment of a light engine 100 where the first laser arrangement 10 in the form of a blue laser bank emits linearly polarized first blue laser light that after passing through a beam homogenizer 61 becomes homogenized linearly polarized first blue laser light 50. The first blue laser light 50 then passes through an optical component 68 that works as a polarizing beam splitter for the first blue laser light 50. The first blue laser light 50 is then focused by lenses 69, 70 onto the phosphor element 13 comprising a motor 114 that rotates a wheel 113 comprising a yellow phosphor track that generates the (green-yellow and/or red) converted light 55, also focused by lenses 69, 70. The (green-yellow and/or red) converted light 55 is totally reflected by the optical component 68 for subsequent combining as will be described below. It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light.

The second laser arrangement 11, also in the form of a blue laser bank, emits linearly polarized second blue laser light that after passing through a beam homogenizer 62 provides homogenized linearly polarized second blue laser light 51.

The second blue laser light 51 falls onto first mirror arrangement 12 and is partly reflected by a polarizing reflector 76 into the first part of second blue laser light 53 as described above. In this embodiment, the first mirror arrangement 12 is a semi reflecting dichroic mirror, which means that the first part of second blue laser light 53 is in the form of linearly polarized blue laser light with a polarization direction 90 degrees rotated with respect to the polarization direction of the first blue laser light 50 produced by the first laser arrangement 10 as described above.

The first part of second blue laser light 53 is reflected by the optical component 68 and thereby becomes combined with the first blue light 50 and they both get focused by the lenses 69, 70 onto the phosphor element 13 and become the converted (green-yellow and/or red) light 55. The converted (green-yellow and/or red) light 55 is then totally reflected by the optical component 68, as mentioned above, and transmitted through the first mirror arrangement 12, remembering that it is a dichroic mirror, and transmitted through a polarizing beam splitter for blue light 64 arranged parallel to the first mirror arrangement 12.

A second part of second blue laser light 52, not reflected by the mirror arrangement 12 is linearly polarized when transmitted through the polarizing beam splitter for blue light 64 and becomes circularly polarized light 75 after going through a quarter lambda plate 67. The circularly polarized light 75 is then focused onto a polarization maintaining reflective diffuser 73. Reflected diffuse blue light is collimated by a lens 66 into collimated blue light 72 and after passing through the quarter lambda plate 67 becomes linearly polarized blue light 74. The linearly polarized blue light 74 has its polarization direction 90 degrees rotated with respect to the polarization direction of the linearly polarized light 52, and it therefore becomes totally reflected by the polarizing beam splitter for blue light 64.

The reflected blue light 74 is then combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

Figure 10:
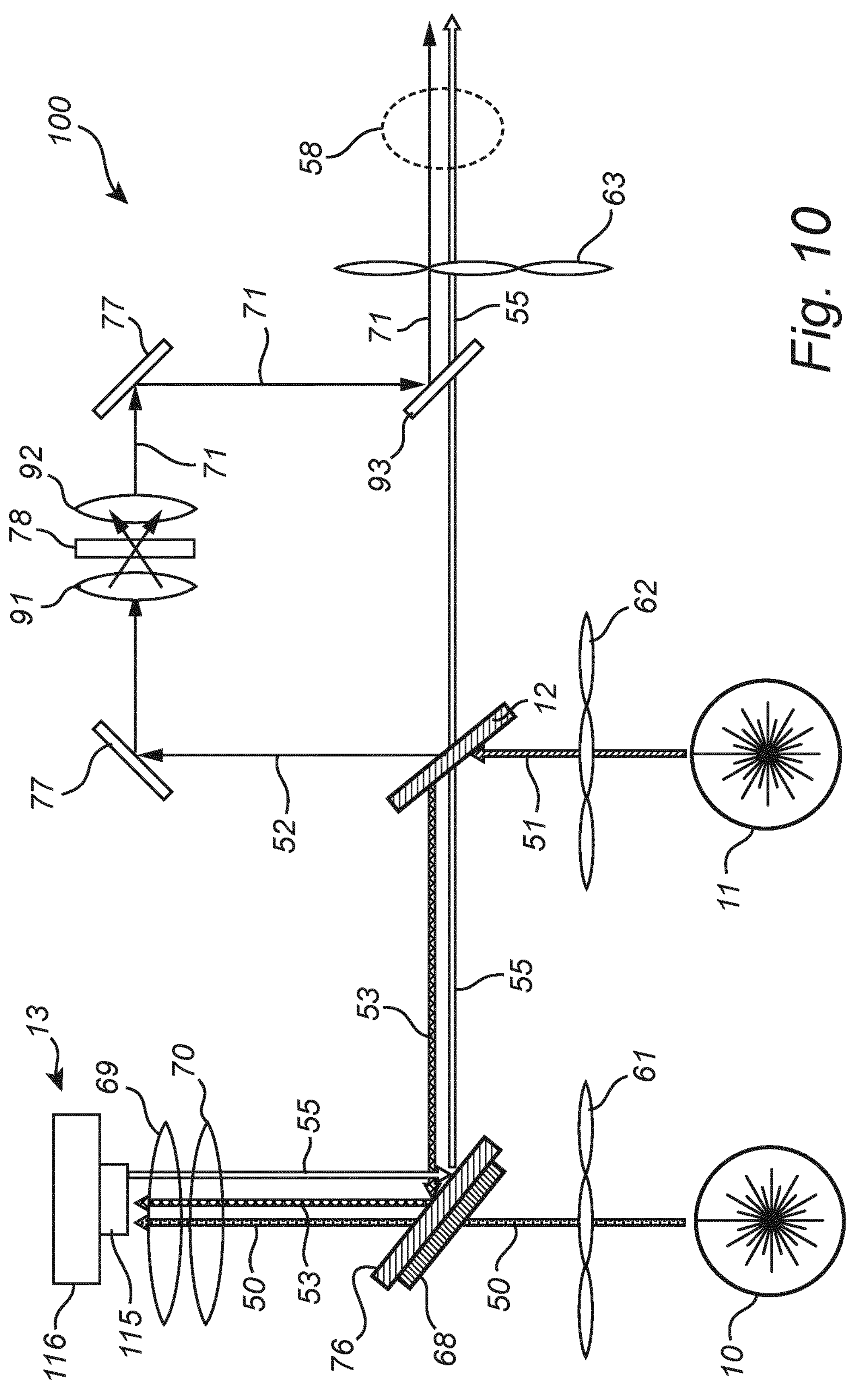

FIG. 10 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through an optical component 68 that works as a polarizing beam splitter for the first blue laser light 50. The first blue laser light 50 is then focused by lenses 69, 70 onto a phosphor element 13 in the form of a phosphor tile 115 arranged on a heatsink 116 that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a yellow phosphor track on a wheel rotated by a motor as exemplified in other embodiments herein.

The second laser arrangement 11, also in the form of a blue laser bank, emits linearly polarized second blue laser light that after passing through a beam homogenizer 62 provides homogenized linearly polarized second blue laser light 51.

The second blue laser light 51 falls onto first mirror arrangement 12 and is partly reflected by a polarizing reflector 76 into the first part of second blue laser light 53 as described above. In this embodiment, the first mirror arrangement 12 is a semi reflecting dichroic mirror, which means that the first part of second blue laser light 53 is in the form of linearly polarized blue laser light with a polarization direction 90 degrees rotated with respect to the polarization direction of the first blue laser light 50 produced by the first laser arrangement 10 as described above.

The first part of second blue laser light 53 is reflected by the optical component 68 and thereby becomes combined with the first blue laser light 50 and they both get focused by the lenses 69, 70 onto the phosphor element 13 and become the converted (green-yellow and/or red) light 55. The converted (green-yellow and/or red) light 55 is then totally reflected by the optical component 68, as mentioned above, and transmitted through the first mirror arrangement 12, remembering that it is a dichroic mirror.

A second part of second blue laser light 52, not reflected by the mirror arrangement 12 is then focused via a reflector 77 and a lens 91 onto a diffuser 78. Diffuse blue light is then collected by a lens 92 becoming collimated blue light 71, which is reflected via reflector 77 and dichroic reflector 93 for blue light to combine with the converted (green-yellow and/or red) light 55 and after going through a homogenizer 63 it exits from the light engine 100 in the form of the engine light 58 having the desired color temperature. Further optical components may then be applied to the engine light 58 for projection as desired.

Figure 11:
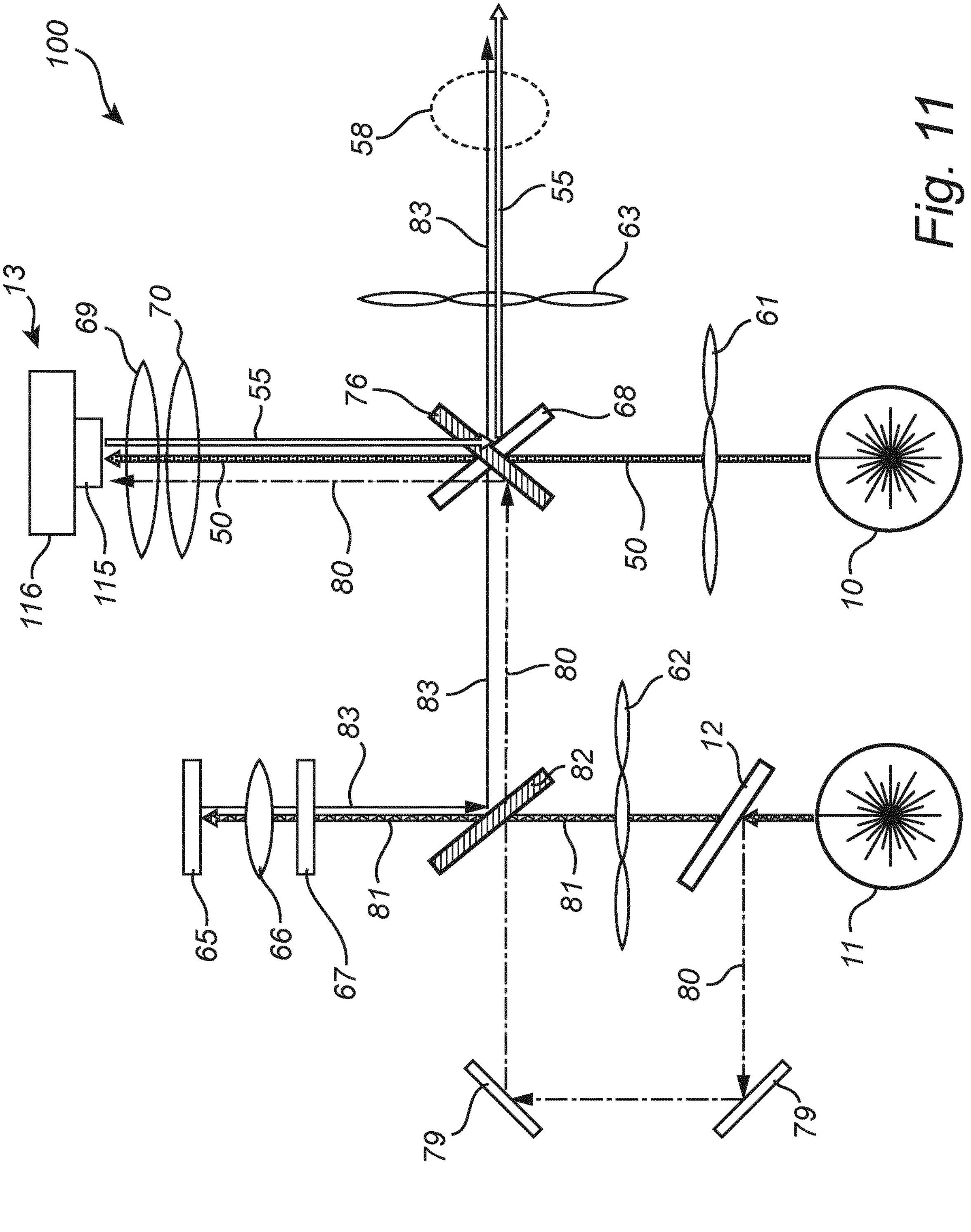

FIG. 11 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through an optical component 68 that works as a polarizing beam splitter for the first blue laser light 50. The first blue laser light 50 is then focused by lenses 69, 70 onto a phosphor element 13 in the form of a phosphor tile 115 arranged on a heatsink 116 that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a yellow phosphor track on a wheel rotated by a motor as exemplified in other embodiments herein.

The second laser arrangement 11, also in the form of a blue laser bank, emits linearly polarized second blue laser light that is split by a mirror arrangement 12 into first and second blue laser light beams 80 and 81.

The first blue laser light beam 80 corresponds to the first part of second blue laser light 53 as exemplified above in connection with FIGS. 8 to 10 and the second blue laser light beam 81 corresponds to the second part of second blue laser light 52 as exemplified above in connection with FIGS. 8 to 10.

The second blue laser light beam 81 is homogenized via a beam homogenizer 62. The first blue laser light beam 80 is reflected via reflectors 79 and via a polarizing beam splitter for blue light 76 thereby becoming combined with the blue light 50 and they both get focused by the lenses 69, 70 onto the phosphor element 13 and become the converted (green-yellow and/or red) light 55. The converted (green-yellow and/or red) light 55 is then totally reflected by the optical component 68 for subsequent combining.

The second blue laser light beam 81, not reflected by the mirror arrangement 12 passes through the polarizing beam splitter 82 and passing through a quarter lambda plate 67 and via a lens 66 it becomes circularly polarized light (left handed), and after getting reflected by a polarization maintaining reflector 65 it becomes opposite handed polarized (for example right handed). After going through the quarter lambda plate 67 again, the polarization becomes 90 degrees rotated (for example s polarization) blue laser light beam 83, which is reflected by polarizing beam splitter 82 and passes through polarizing beam splitter 76 and optical component 68 and gets combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

Figure 12:
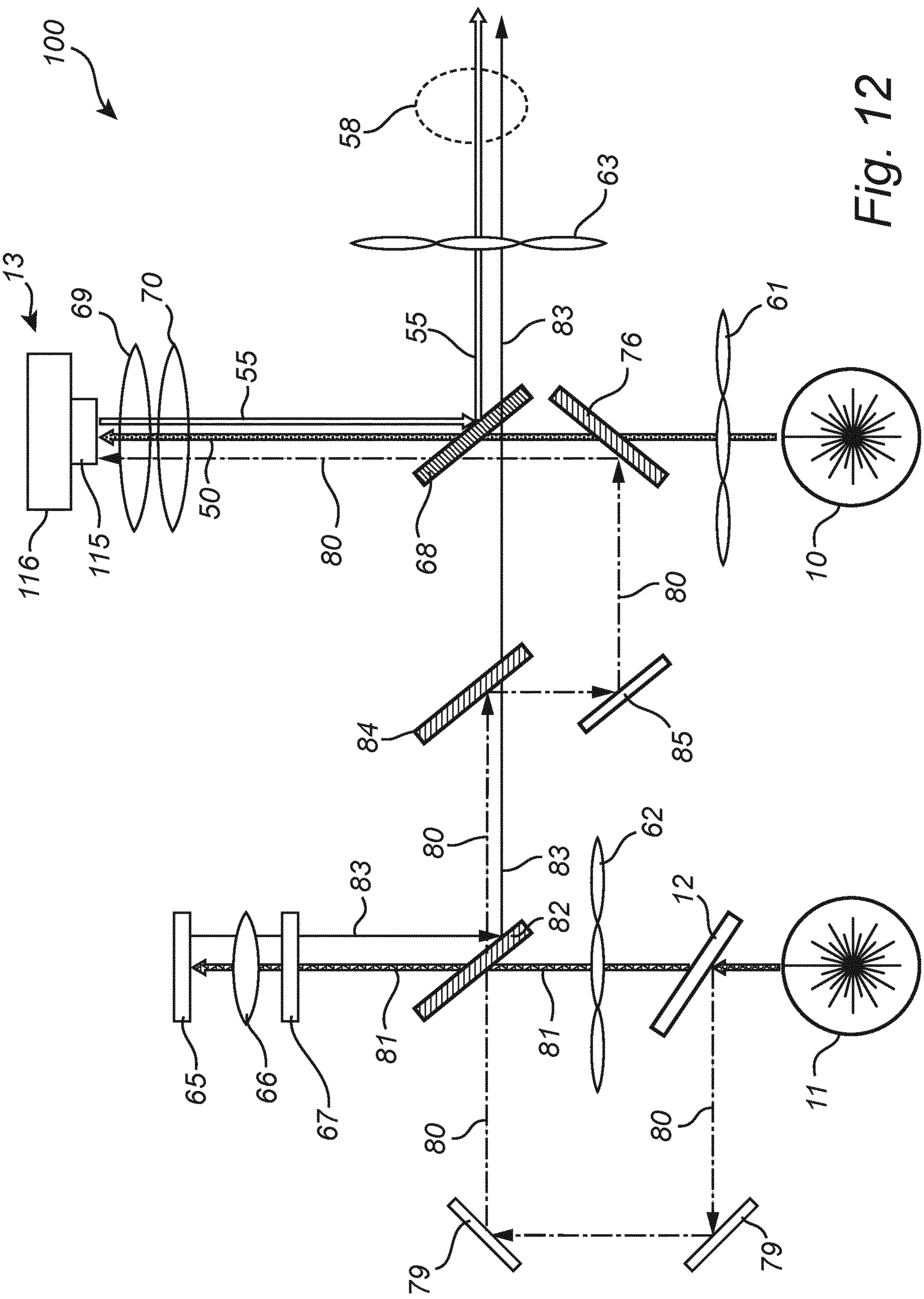

FIG. 12 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through a polarizing beam splitter for blue light 76 and an optical component 68. The first blue laser light 50 is then focused by lenses 69, 70 onto a phosphor element 13 in the form of a phosphor tile 115 arranged on a heatsink 116 that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a yellow phosphor track on a wheel rotated by a motor as exemplified in other embodiments herein.

The second laser arrangement 11, also in the form of a blue laser bank, emits linearly polarized second blue laser light that is split by a mirror arrangement 12 into first and second blue laser light beams 80 and 81.

The first blue laser light beam 80 corresponds to the first part of second blue laser light 53 as exemplified above in connection with FIGS. 8 to 10 and the second blue laser light beam 81 corresponds to the second part of second blue laser light 52 as exemplified above in connection with FIGS. 8 to 10.

The second blue laser light beam 81 is homogenized via a beam homogenizer 62. The first blue laser light beam 80 is reflected via reflectors 79, polarizing beam splitter for blue light 84 and reflector 85 and via a polarizing beam splitter for blue light 76 thereby becoming combined with the blue light 50 and they both get focused by the lenses 69, 70 onto the phosphor element 13 and become the converted (green-yellow and/or red) light 55. The converted (green-yellow and/or red) light 55 is then totally reflected by the optical component 68 for subsequent combining.

The second blue laser light beam 81, not reflected by the mirror arrangement 12 passes through the polarizing beam splitter 82 and passing through a quarter lambda plate 67 and via a lens 66 it becomes circularly polarized light (left handed), and after getting reflected by a polarization maintaining reflector 65 it becomes opposite handed polarized (for example right handed). After going through the quarter lambda plate 67 again, the polarization becomes 90 degrees rotated (for example s polarization) blue laser light beam 83, which is reflected by polarizing beam splitter 82 and passes through polarizing beam splitter 84 and optical component 68 and gets combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

Figure 13:
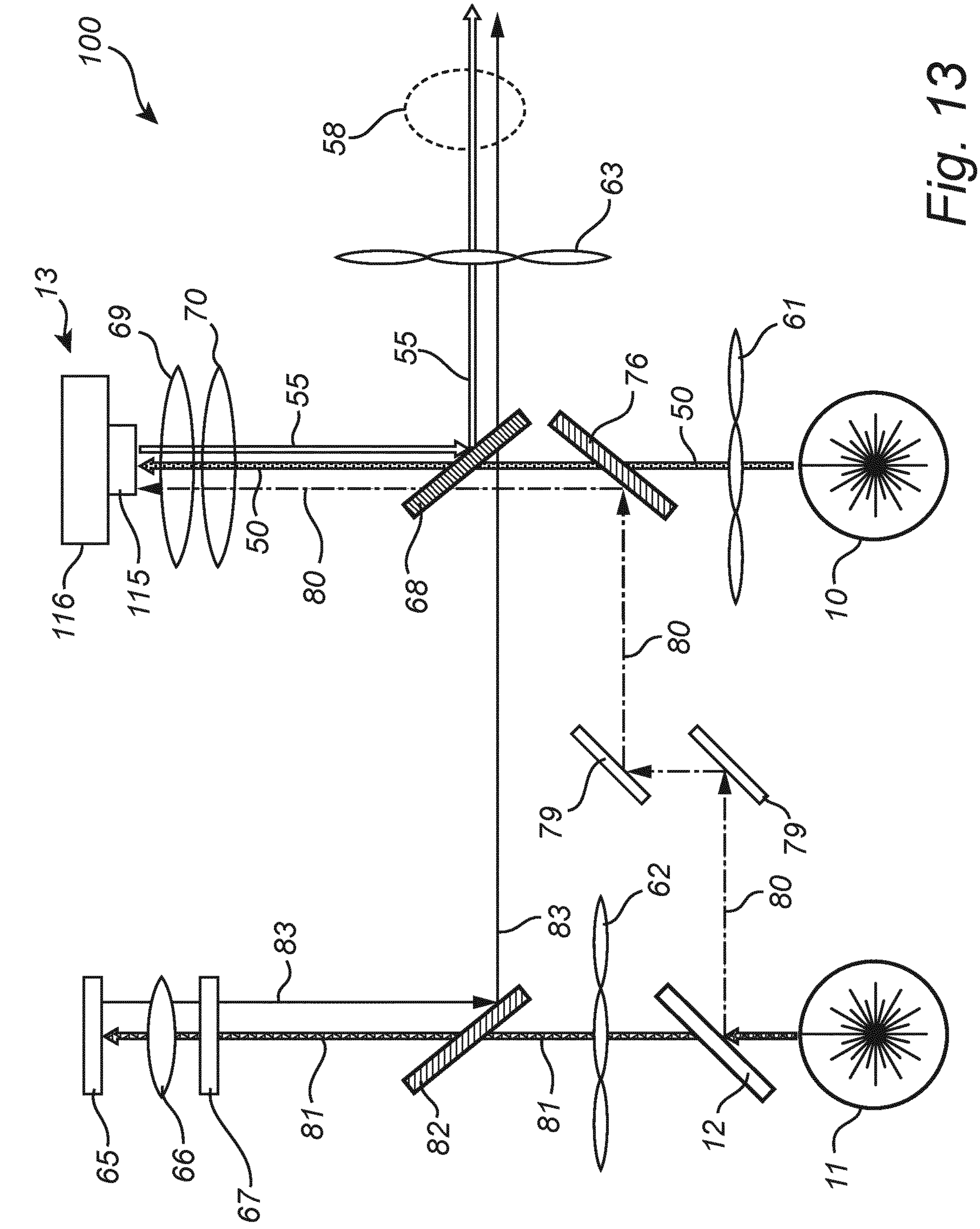

FIG. 13 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through a polarizing beam splitter for blue light 76 and an optical component 68. The first blue laser light 50 is then focused by lenses 69, 70 onto a phosphor element 13 in the form of a phosphor tile 115 arranged on a heatsink 116 that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a yellow phosphor track on a wheel rotated by a motor as exemplified in other embodiments herein.

The second laser arrangement 11, also in the form of a blue laser bank, emits linearly polarized second blue laser light that is split by a mirror arrangement 12 into first and second blue laser light beams 80 and 81.

The first blue laser light beam 80 corresponds to the first part of second blue laser light 53 as exemplified above in connection with FIGS. 8 to 10 and the second blue laser light beam 81 corresponds to the second part of second blue laser light 52 as exemplified above in connection with FIGS. 8 to 10.

The second blue laser light beam 81 is homogenized via a beam homogenizer 62. The first blue laser light beam 80 is reflected via reflectors 79 and polarizing beam splitter for blue light 76 thereby becoming combined with the first blue laser light 50 and they both get focused by the lenses 69, 70 onto the phosphor element 13 and become the converted (green-yellow and/or red) light 55. The converted (green-yellow and/or red) light 55 is then totally reflected by the optical component 68 for subsequent combining.

The second blue laser light beam 81, not reflected by the mirror arrangement 12 passes through the polarizing beam splitter 82 and passing through a quarter lambda plate 67 and via a lens 66 it becomes circularly polarized light (left handed), and after getting reflected by a polarization maintaining reflector 65 it becomes opposite handed polarized (for example right handed). After going through the quarter lambda plate 67 again, the polarization becomes 90 degrees rotated (for example s polarization) blue laser light beam 83, which is reflected by polarizing beam splitter 82 and passes through optical component 68 and gets combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

Figure 14:
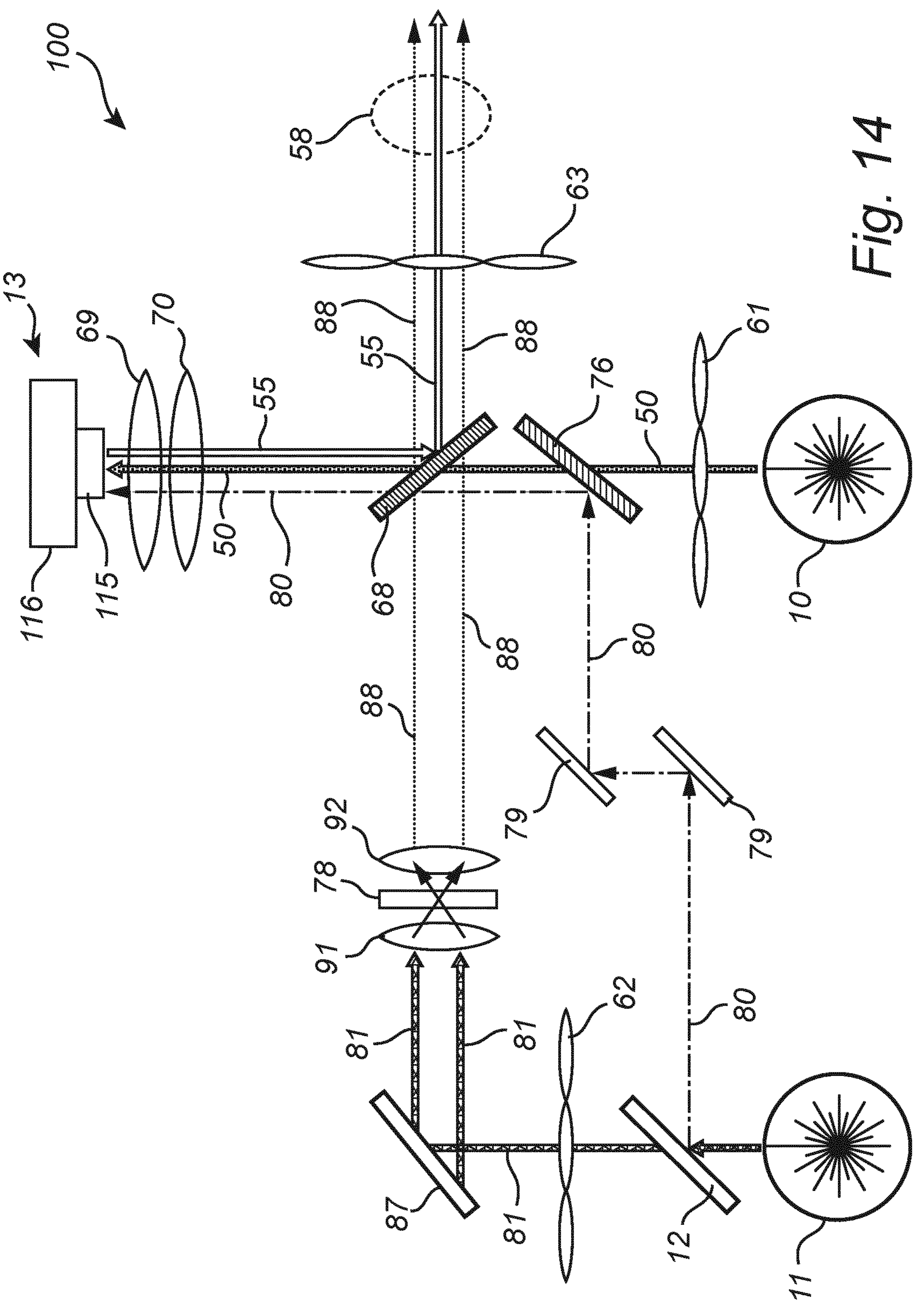

FIG. 14 illustrates an embodiment of a light engine 100 where the first laser arrangement 10 in the form of a blue laser bank emits linearly polarized first blue laser light that after passing through a beam homogenizer 61 provides homogenized linearly polarized first blue laser light 50. The first blue laser light 50 then passes through a polarizing beam splitter for blue light 76 and an optical component 68. The first blue laser light 50 is then focused by lenses 69, 70 onto a phosphor element 13 in the form of a phosphor tile 115 arranged on a heatsink 116 that generates the (green-yellow and/or red) converted light 55, also focused by lenses 69, 70. The (green-yellow and/or red) converted light 55 is totally reflected by the optical component 68 for subsequent combining as will be described below.

It is to be noted that the optical component 68 may be a single component that performs the polarizing beam splitting of the first blue laser light 50 and the total reflection of the (green-yellow and/or red) converted light 55. However, the optical component 68 may also be in the form of a two components dichroic reflector for yellow light and polarizing beam splitter for blue light. Furthermore, the phosphor element 13 may alternatively be in the form of a yellow phosphor track on a wheel rotated by a motor as exemplified in other embodiments herein.

The second laser arrangement 11, also in the form of a blue laser bank, emits linearly polarized second blue laser light that is split by a mirror arrangement 12 into first and second blue laser light beams 80 and 81.

The first blue laser light beam 80 corresponds to the first part of second blue laser light 53 as exemplified above in connection with FIGS. 8 to 10 and the second blue laser light beam 81 corresponds to the second part of second blue laser light 52 as exemplified above in connection with FIGS. 8 to 10.

The second blue laser light beam 81 is homogenized via a beam homogenizer 62. The first blue laser light beam 80 is reflected via reflectors 79 and polarizing beam splitter for blue light 76 thereby becoming combined with the first blue laser light 50 and they both get focused by the lenses 69, 70 onto the phosphor element 13 and become the converted (green-yellow and/or red) light 55. The converted (green-yellow and/or red) light 55 is then totally reflected by the optical component 68 for subsequent combining.

The second blue laser light beam 81, not reflected by the mirror arrangement 12 passes through a beam homogenizer 62 and focused via a reflector 87 and a lens 91 onto a diffuser 78. Diffuse blue light is then collected by a lens 92 becoming collimated blue light 88 and passes through optical component 68 and gets combined with the converted (green-yellow and/or red) light 55 and after going through a homogenizer 63 it exits from the light engine 100 in the form of the engine light 58 having the desired color temperature. Further optical components may then be applied to the engine light 58 for projection as desired.

The person skilled in the art realizes that the present invention by no means is limited to the preferred embodiments described above. On the contrary, many modifications and variations are possible within the scope of the appended claims.

The invention claimed is:

1. A light engine configured to generate engine light and comprising:

a first laser arrangement configured to emit first blue laser light;

a second laser arrangement configured to emit second blue laser light;

a first mirror arrangement being partially reflective for the second blue laser light and partially transmissive for the second blue laser light and configured to split the second blue laser light emitted by the second laser arrangement into a first part of second blue laser light and a second part of second blue laser light, wherein the ratio of the first part of second blue laser light to the second part of second blue laser light is in a range from 0.1 to 2;

a beam combiner arranged downstream of the first mirror arrangement and configured to combine the first blue laser light (50) and the first part of second blue laser light and to direct the combination of the first blue laser light and the first part of second blue laser light to a phosphor element;

the phosphor element arranged downstream of the beam combiner and configured to receive the first blue laser light emitted by the first laser arrangement and receive the first part of second blue laser light, and convert the first blue laser light emitted by the first laser arrangement and the first part of second blue laser light into converted light, and wherein:

the light engine further comprises a diffuser configured to diffuse the second part of second blue laser light, and the light engine is configured to collimate the converted light emitted by the phosphor element and to combine the collimated converted light with the second part of second blue laser light emitted by the second laser arrangement to generate the engine light; and wherein the engine light is white light having a correlated colour temperature in a range from 2700 K to 10000 K, preferably in a range 5000 K to 10000 K, and a colour rendering index of at least 70, preferably at least 80, more preferably at least 85, most preferably at least 88.

2. The light engine of claim 1, where the first mirror arrangement is specularly reflective with a reflectivity of at least 80%, preferably at least 85%, more preferably at least 90%, for the second blue laser light emitted by the second laser arrangement.

3. The light engine according to claim 1, wherein the first mirror arrangement is configured to adjust a ratio between the first part of second blue laser light and the second part of second blue laser light.

4. The light engine according to claim 3, wherein the first mirror arrangement is configured such that it is spatially adjustable for the adjustment of the ratio between the first part of second blue laser light and the second part of second blue laser light.

5. The light engine of claim 3, where the second laser arrangement comprises a plurality of individual second laser beam emitters, and where the first mirror arrangement comprises a mirror configured to reflect laser beams emitted by a subset of the second laser beam emitters.

6. The light engine of claim 3, where the second laser arrangement comprises a plurality of individual second laser beam emitters, and where the first mirror arrangement comprises a plurality of beam mirrors configured to reflect respective laser beams emitted by a subset of the second laser beam emitters.

7. The light engine of claim 6, where a respective cross-sectional area of the beam mirrors is greater than a respective cross-sectional area of the laser beams reflected by the beam mirrors.

8. The light engine of claim 6, where the beam mirrors and/or the beam holes are circular, oval or elliptical.

9. The light engine of claim 3, where the second laser arrangement-comprises a plurality of individual second laser beam emitters, and where the first mirror arrangement comprises a plurality of beam mirrors configured to reflect respective parts of laser beams emitted by at least a subset of the second laser beam emitters.

10. The light engine of claim 9, where a respective cross-sectional area of the beam mirrors is less than 0.25 times a respective cross-sectional area of the laser beams reflected by the beam mirrors.

11. The light engine of claim 3, where the second laser arrangement comprises a plurality of individual second laser beam emitters, and where the first mirror arrangement comprises a mirror configured with plurality of beam holes for passage of respective laser beams emitted by a subset of the second laser beam emitters.

12. The light engine of claim 11, where a respective cross-sectional area of the beam holes is greater than a respective cross-sectional area of the laser beams passing through the beam holes.

13. The light engine of claim 3, where the second laser arrangement comprises a plurality of individual second laser beam emitters, and where the first mirror arrangement comprises a mirror configured with plurality of beam holes for passage of respective parts of laser beams emitted by at least a subset of the second laser beam emitters.

14. The light engine of claim 13, where a respective cross-sectional area of the beam holes is less than 0.25 times a respective cross-sectional area of the laser beams passing through the beam holes.

15. A luminaire comprising a light engine of claim 1 and a controller for controlling the first and second laser arrangement.

* * * * *